US009357524B2

(12) United States Patent
Vaidya et al.

(10) Patent No.: US 9,357,524 B2
(45) Date of Patent: May 31, 2016

(54) SUBSCRIBER-AWARE PAGING

(71) Applicant: CISCO TECHNOLOGY, INC., San Jose, CA (US)

(72) Inventors: Maulik Vaidya, Alpharetta, GA (US); Lingesh Munagala, Nashua, NH (US); Arun C. Alex, Nashua, NH (US); Gibson Soon Teck Ang, Westford, MA (US); Sailakshmi Mahalingham, Nashua, NH (US); Adi Raja Murugan, Pune (IN); Gaurav Vaid, Streamwood, IL (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/737,970

(22) Filed: Jun. 12, 2015

(65) Prior Publication Data

US 2015/0282118 A1 Oct. 1, 2015

Related U.S. Application Data

(63) Continuation of application No. 13/690,365, filed on Nov. 30, 2012, now Pat. No. 9,060,347.

(51) Int. Cl.
*H04W 8/06* (2009.01)
*H04W 68/04* (2009.01)
*H04W 60/00* (2009.01)

(52) U.S. Cl.
CPC ............... *H04W 68/04* (2013.01); *H04W 8/06* (2013.01); *H04W 60/00* (2013.01)

(58) Field of Classification Search
CPC ....... H04W 8/06; H04W 68/00; H04W 60/00; H04W 68/04
USPC .................. 370/236, 252, 328; 455/436, 458
See application file for complete search history.

(56) References Cited

U.S. PATENT DOCUMENTS 5,153,902 A 10/1992 Buhl et al.
5,940,762 A 8/1999 Lee et al.
(Continued)

FOREIGN PATENT DOCUMENTS

SE WO 2010/071545 A1 * 6/2010 ............ H04W 60/00
WO WO2010/071545 A1 6/2010

OTHER PUBLICATIONS

3GPP TS 23.401 v8.3.0 (Sep. 2008), 3rd Generation Partnership Project; Technical Specification Group Services and System Aspects; General Packet Radio Service (GPRS) enhancements for Evolved Universal Terrestrial Radio Access Network (E/UTRAN) access (Release 8), http://www.3gpp.org. 204 pages.
(Continued)

*Primary Examiner* — William Nealon
(74) *Attorney, Agent, or Firm* — Patent Capital Group

(57) ABSTRACT

This disclosure relates to systems and methods for paging devices in a communication network. A network device providing mobility management through control messaging can be assigned a number of cell sites in multiple tracking areas. The network device such as a mobility management entity (MME) can use a subscriber-aware implementation to provide a hierarchy for contacting a mobile device with a page. The subscriber-aware implementation can be tailored to analyze subscriber activity such as frequency and timing, to page a subset of the total number of cell sites in multiple tracking areas based on the subscriber activity, and to expand the subset after unsuccessful attempts to page the mobile device.

21 Claims, 8 Drawing Sheets

(56) References Cited

U.S. PATENT DOCUMENTS

| | | | |
|---|---|---|---|
| 5,995,832 A | 11/1999 | Mallinckrodt | |
| 6,438,383 B1 | 8/2002 | Hall et al. | |
| 6,553,217 B1 | 4/2003 | Kundorf | |
| 6,748,247 B1 | 6/2004 | Ramakrishnan et al. | |
| 6,781,972 B1 | 8/2004 | Anderlind et al. | |
| 7,154,868 B1 | 12/2006 | Sharma et al. | |
| 7,289,480 B2 | 10/2007 | Lundstrom et al. | |
| 7,489,936 B1 | 2/2009 | Liu | |
| 8,428,625 B2 | 4/2013 | Ramankutty et al. | |
| 8,503,308 B1* | 8/2013 | Oroskar | H04W 68/04 370/229 |
| 8,526,945 B2* | 9/2013 | Knauft | H04W 8/06 455/435.1 |
| 9,060,347 B2 | 6/2015 | Vaidya et al. | |
| 2002/0057649 A1 | 5/2002 | Kinnunen | |
| 2002/0105970 A1 | 8/2002 | Shvodian | |
| 2003/0026211 A1 | 2/2003 | Xu et al. | |
| 2003/0221016 A1 | 11/2003 | Jouppi et al. | |
| 2003/0235171 A1 | 12/2003 | Lundstrom et al. | |
| 2004/0022212 A1 | 2/2004 | Chowdhury et al. | |
| 2004/0022258 A1 | 2/2004 | Tsukada et al. | |
| 2004/0109426 A1 | 6/2004 | Veerepalli et al. | |
| 2004/0120283 A1 | 6/2004 | Rezaiifar et al. | |
| 2004/0151155 A1 | 8/2004 | Jouppi | |
| 2004/0152422 A1 | 8/2004 | Hoglund et al. | |
| 2004/0203825 A1 | 10/2004 | Daniel et al. | |
| 2004/0203894 A1 | 10/2004 | Watanabe et al. | |
| 2004/0205247 A1 | 10/2004 | Ahn | |
| 2005/0003856 A1 | 1/2005 | Jang et al. | |
| 2005/0025116 A1 | 2/2005 | Chen et al. | |
| 2005/0044138 A1 | 2/2005 | Albert et al. | |
| 2005/0129013 A1 | 6/2005 | Rasanen | |
| 2005/0136884 A1 | 6/2005 | Reidelsturz et al. | |
| 2005/0149754 A1 | 7/2005 | Rasanen | |
| 2005/0159167 A1 | 7/2005 | Hakalin et al. | |
| 2007/0259673 A1 | 11/2007 | Willars et al. | |
| 2008/0130568 A1 | 6/2008 | Gallagher et al. | |
| 2009/0129307 A1 | 5/2009 | Akhtar et al. | |
| 2009/0176513 A1 | 7/2009 | Bosch et al. | |
| 2009/0286528 A1 | 11/2009 | Lie et al. | |
| 2010/0069088 A1* | 3/2010 | Fischer | H04W 60/04 455/456.1 |
| 2010/0075698 A1* | 3/2010 | Rune | H04W 68/08 455/458 |
| 2010/0124223 A1 | 5/2010 | Gibbs et al. | |
| 2011/0096721 A1* | 4/2011 | Kamalaraj | H04W 60/00 370/328 |
| 2011/0096731 A1 | 4/2011 | Kamalaraj et al. | |
| 2011/0176424 A1 | 7/2011 | Yang et al. | |
| 2011/0261715 A1* | 10/2011 | Norefors | H04W 60/00 370/252 |
| 2011/0286465 A1 | 11/2011 | Koodli et al. | |
| 2012/0063464 A1 | 3/2012 | Mehta | |
| 2012/0157132 A1* | 6/2012 | Olsson | H04W 68/00 455/458 |
| 2012/0252451 A1* | 10/2012 | Knauft | H04W 8/06 455/436 |

OTHER PUBLICATIONS

3GPP TS 23.402 v8.3.0 (Sep. 2008), 3rd Generation Partnership Project; Technical Specification Group Services and System Aspects; Architecture enhancements for non/3GPP accesses (Release 8), http://www.3gpp.org. 190 pages.

3GPP TS 29.212 v8.1.0 (Sep. 2008), 3rd Generation Partnership Project; Technical Specification Group Core Network and Terminals; Policy and Charging Control over Gx reference point (Release 8), http://www.3gpp.org. 60 pages.

Alcatei/Lucent. "MME Overload Control by Throttling of DL Low Priority Traffic." Mobile Competence Centre. Meeting #81. Prague, Czech Republic. Oct. 11/15, 2010. 7 pages.

Draft; S2/102488, Mobile Competence Centre; 650, Route Des Lucioles; F/06921, France. vol. Alcatei/Lucent. "NIMTC/MME/SGSN Overload Control by DL MTC Traffic Throttling." 3GPP SA WG2, Meeting# 79. Kyoto, Japan. May 10/14, 2010. 2 pages.

Huawei. "IMS Multimedia Priority Services Solution for eMPS." 3GPP Draft; S2/101087, Mobile Competence Centre. Meeting #77. San Francisco, Feb. 22/26, 2010. 4 pages.

International Search Report and Written Opinion for International Application No. PCT/US11/37407 mailed Jul. 27, 2011. 12 pages.

International Search Report and Written Opinion issued for PCT/US09/64979, mailed Feb. 25, 2010 (6 pages).

* cited by examiner

SUBSCRIBER-AWARE PAGING

RELATED APPLICATION

This application is a continuation (and claims the benefit of priority under 35 U.S.C. §120) of U.S. application Ser. No. 13/690,365, filed Nov. 30, 2012, entitled "SUBSCRIBER-AWARE PAGING," Inventors Maulik Vaidya, et al. The disclosure of the prior application is considered part of (and is incorporated in its entirety by reference in) the disclosure of this application.

FIELD OF THE DISCLOSURE

This disclosure relates to systems and methods for paging devices in a communication network.

BACKGROUND

Wireless networks are telecommunications networks that use radio waves to carry information from one node in the network to one or more receiving nodes in the network. Wired communication can also be used in portions of a wireless network, such as between cells or access points. Cellular telephony is characterized by the use of radio cells that provide radio coverage for a geographic area, with multiple cells arranged to provide contiguous radio coverage over a larger area.

Wireless communication technologies are used in connection with many applications, including, for example, satellite communications systems, portable digital assistants (PDAs), laptop computers, and mobile devices (e.g., cellular telephones, user equipment). One benefit that users of such applications can obtain is the ability to connect to a network (e.g., the Internet) as long as the user is within range of such a wireless communication technology.

DESCRIPTION OF EXAMPLE EMBODIMENTS

Overview

Figure 1:
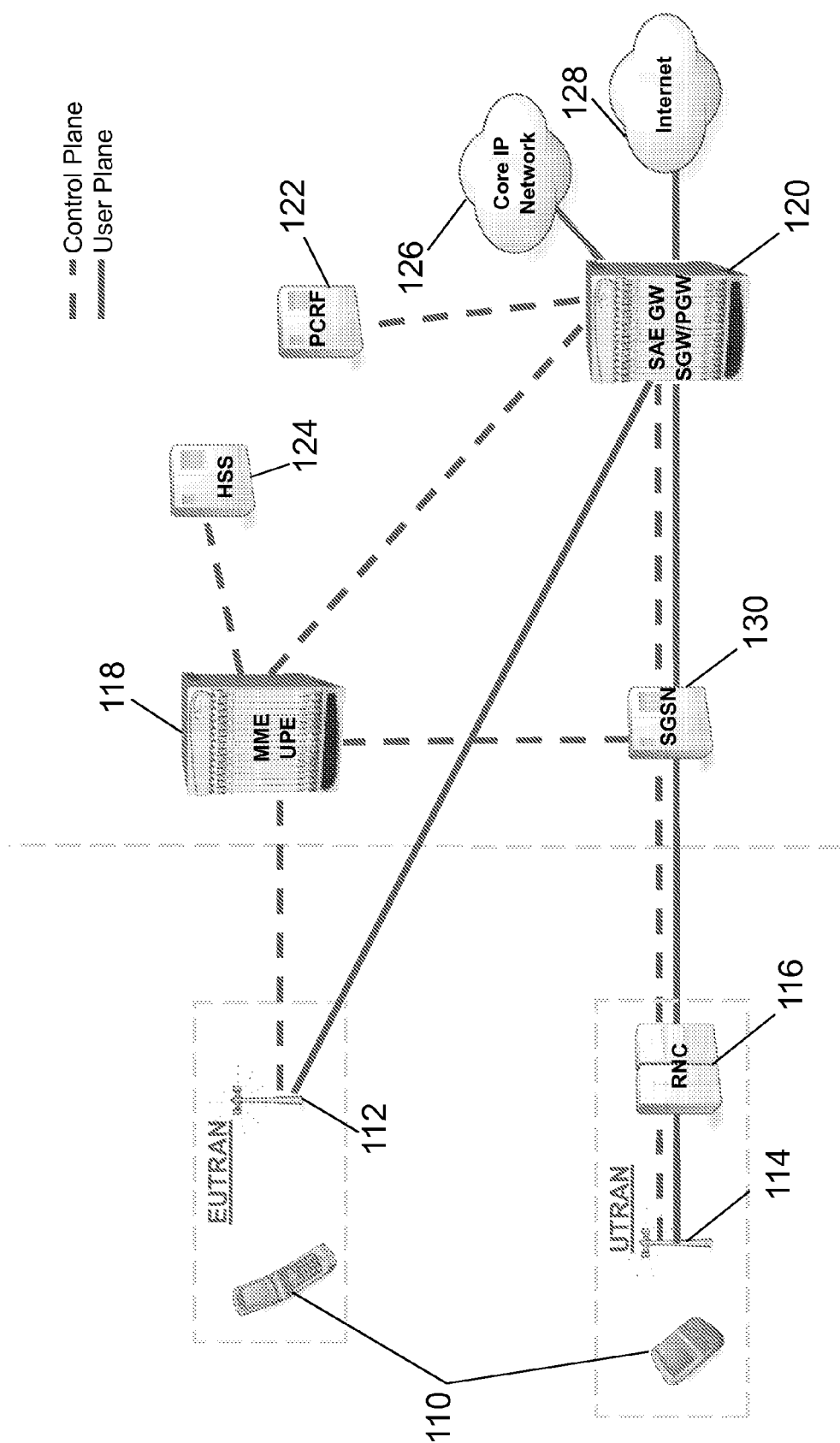
FIG. 1 illustrates a network diagram in accordance with certain embodiments.

The present system and method include maintaining, at a mobility management entity (MME) in a communication network, a list of eNodeBs from which a user equipment (UE) was actively communicating with the communication network, the communication network including eNodeBs arranged into at least one tracking area; receiving a page request for the UE at the MME; sending a first page request to a first set of the eNodeBs in the tracking area based on the eNodeBs with which the UE was last actively communicating; identifying a second set of eNodeBs to receive a paging request based on subscriber location activity of the UE, where the subscriber location activity includes one or more location identifiers associated with the UE, one or more system time stamps of the MME, and a subscriber identifier associated with the UE; and sending a second page request to a second set of eNodeBs with at least some different eNodeBs than the first set, if a response is not received after the first page request.

Example Embodiments

Systems and methods of providing subscriber-aware paging in a communication network are disclosed in certain embodiments. A page can be a message sent from a network device, such as a server or a correspondent node in the communication network in order to begin communications with a mobile device, such as user equipment (UE), access terminal (AT), or other device. Pages are typically sent on a one-way control channel from a network device to a mobile user. Pages can be sent according to a protocol and in a manner that allows a mobile device to conserve power by idling many functions while not in use, and by waking up to listen for a specific paging message before activating. The message, a page, can indicate to the mobile device that a network device has information for the mobile device or desires to establish a session with the mobile device. The page can prompt the mobile device to send a response that results in the establishment of a radio connection with a base station in order to receive information on a data path. Multiple levels of paging messages can be used; for example, there can be a short page message that causes the mobile device to wake for a longer page message.

In order to locate a mobile device that is conserving power, a page message may be sent to many base stations in order to locate the mobile device. If the page is broadcast to a number of base stations, this can lead to inefficiencies in using communication network resources. This is because each base station receiving a page broadcasts the page over the radio spectrum in order to determine if the mobile device is within range of the base station. If the mobile device is within range, then the mobile device responds and this location information can be relayed back to the network. In some network topologies, such as long term evolution (LTE), a mobility management entity (MME) is responsible for paging the mobile device, such as user equipment (UE), within the UE's registered tracking area. The tracking area can include a number of base stations, such as eNodeBs (eNBs), which need to be paged depending on the size of the tracking area.

FIG. 1 illustrates a network diagram in accordance with certain embodiments. FIG. 1 illustrates both a universal mobile telecommunication system (UMTS) release 8 network and an LTE network. The network diagram of FIG. 1 includes a user equipment (UE) 110, an evolved nodeB (eNB) 112, a nodeB 114, a radio network controller (RNC) 116, a mobility management entity (MME)/user plane entity (UPE) 118, a system architecture evolution gateway (SAE GW) 120, a policy and charging rules function (PCRF) 122, a home subscriber server (HSS) 124, a core IP network 126, an Internet 128, and a Serving General packet radio service Support Node (SGSN) 130. MME 118, SAE GW 120, and SGSN 130 can be implemented in a gateway as described below. SAE GW 120 can include a serving gateway (SGW) as well as a packet data network gateway (P-GW). In some embodiments, the SGW and P-GW can be implemented on separate network devices. The main component of the SAE architecture is the Evolved Packet Core (EPC), also known as SAE Core. The EPC includes the MME, SGW and P-GW components.

MME 118, which can be implemented on a chassis as described below, is a control-node for the LTE access network. MME 118 is responsible for UE tracking and paging procedures including retransmissions. MME 118 handles the bearer activation/deactivation process and is also responsible for choosing the SGW for a UE at the initial attach and at time of an intra-LTE handover. MME 118 also authenticates the user by interacting with HSS 124. MME 118 also generates and allocates temporary identities to UEs and terminates Non-Access Stratum (NAS) signaling. MME 118 checks the authorization of UE 110 to camp on the service provider's Public Land Mobile Network (PLMN) and enforces UE roaming restrictions. MME 118 is the termination point in the network for ciphering/integrity protection for NAS signaling and handles security key management. Lawful interception of signaling is also supported by MME 118. MME 118 also provides the control plane function for mobility between LTE and 2G/3G access networks with the S3 interface terminating at MME 118 from SGSN 130. MME 118 also terminates the S6a interface towards the home HSS for roaming UEs.

The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PDN GW). For idle state UEs, the SGW terminates the down link data path and triggers paging when down link data arrives for UE 110. The SGW manages and stores UE contexts, e.g. parameters of the IP bearer service and network internal routing information. The SGW also performs replication of the user traffic in case of lawful interception. The P-GW provides connectivity to UE 110 to external packet data networks by being the point of exit and entry of traffic for UE 110. A UE may have simultaneous connectivity with more than one P-GW for accessing multiple packet data networks. The P-GW performs policy enforcement, packet filtering for each user, charging support, lawful interception, and packet screening. The P-GW also provides an anchor for mobility between 3GPP and non-3GPP technologies such as WiMAX and 3GPP2 standards (CDMA 1x and EVDO).

Figure 2B:
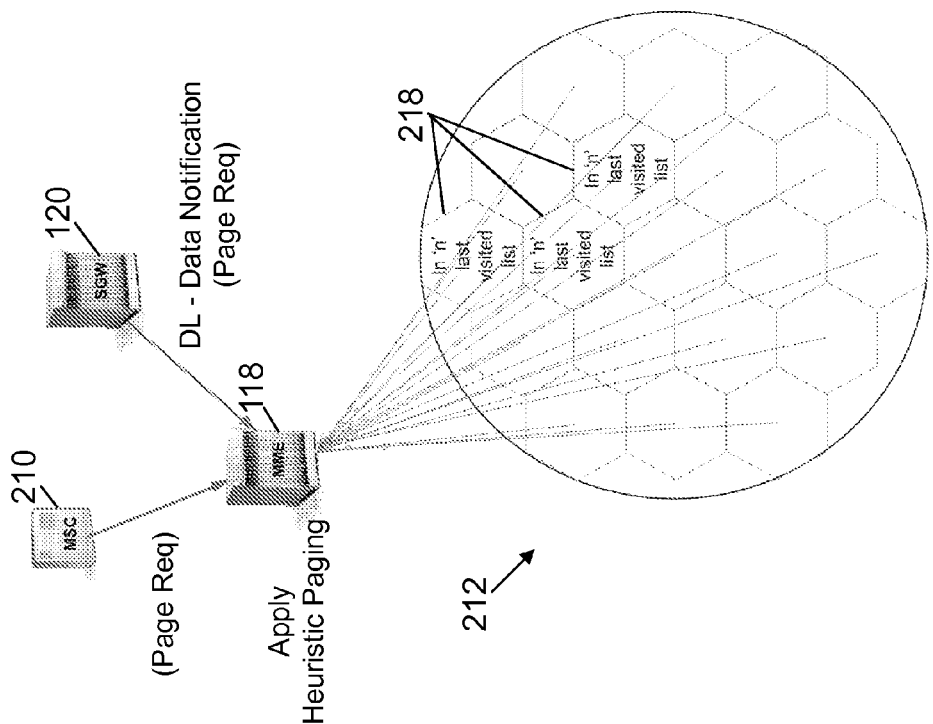
FIGS. 2A-2B illustrate communication of page messaging through a communication network to base stations in accordance with certain embodiments.
Figure 2A:
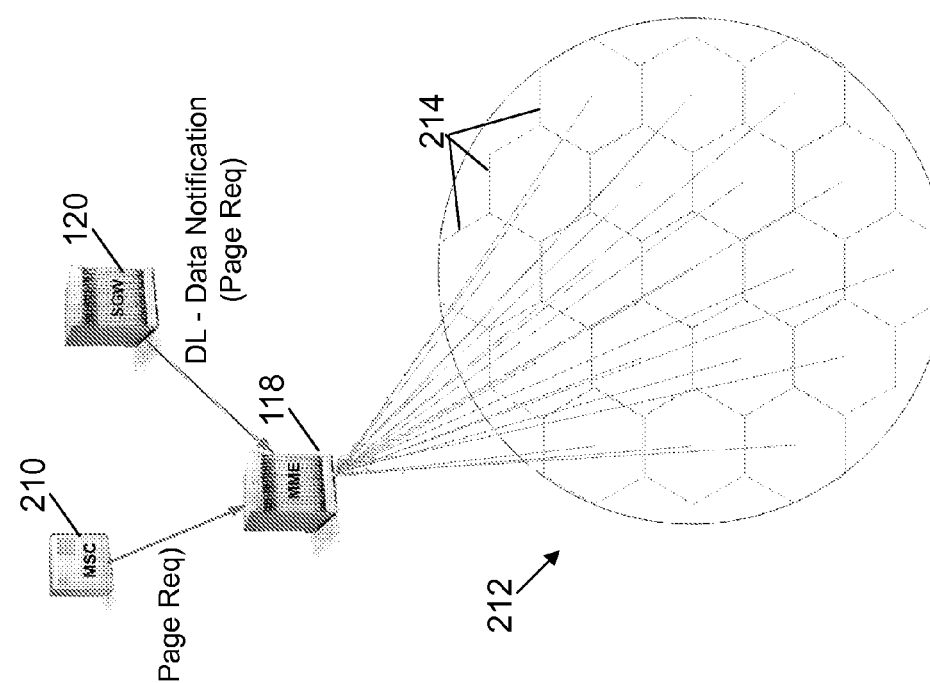

FIGS. 2A-2B illustrate communication of page messaging through a communication network to base stations, such as eNodeBs, in accordance with certain embodiments. FIG. 2A includes MME 118, SGW 120, a mobile switching center (MSC) 210, and a tracking area 212 of eNodeB cell sites including eNodeB cells 214. Page requests can originate from SGW 120 or from an MSC 210. MSC 210 can be a gateway device that interfaces with the Public Switched Telephone Network (PSTN) to provide communication between circuit-switched phones and devices and the operator's access network including MME 118 and other devices such as SAE GW 120. For example, a page request originating from MSC 210 can be provided when the user of a landline phone is trying to call a mobile device in the wireless communication network. SGW 120 can provide a page request relating to data received that is intended for the mobile device from the packet data network, e.g., the Internet, or from another mobile device. Voice over IP calls can also come through SGW 120, in some embodiments. The page request from SGW 120 can be a downlink data notification.

MME 118 provides paging to mobile devices such as UEs. MME 118 is specified to send the page to all eNodeB cells 214 in tracking area 212 where the UE was last registered. As shown, this can lead to a page being sent to a number of eNodeB cells 214 and subsequently being transmitted over the paging channel by a number of eNodeBs to find a mobile device.

FIG. 2B illustrates sending of page messaging using heuristics in accordance with certain embodiments. FIG. 2B includes MME 118, SGW 120, MSC 210, and tracking area 212 of eNodeB cell sites including eNodeB cells 218. The heuristics can include rules that determine which base stations are to be sent a page. The heuristics-based paging can include keeping a list of a specified number of eNBs inside the tracking area which the UE last visited. For example, this list can include the last five non-duplicative tracking area identities (TAI) from which there was communication with a UE. The list can also collect location information from the UE or base station, such as a cell ID or other eNB identifying information.

In FIG. 2B, SGW 120 and MSC 210 can both send page requests to MME 118. MME 118 upon receiving a page request can apply heuristics to send one or more pages within the tracking area. For example, MME 118 can first send a page to eNB cell sites on a specified list (a recent activity list), which would include the last 'n' number of cell sites 218 which the UE last visited. MME 118 can use location information to determine cell sites to be included in a page. For example, MME 118 can use the location information received at the MME regarding the UE's location (such as a Tracking Area Identity) to send a page request to neighboring cell sites in the last Tracking Area. Neighboring cell sites can include immediately adjacent cell sites or cell sites within a certain range of the last visited cell site. MME 118 can use a combination of a list of cell sites from which the UE last actively communicated in conjunction with location information to page the UE. A paging heuristic based on activity and location information can be tiered such that the surrounding cell sites are paged first. Additionally, the activity list can include information regarding frequency of communication from a cell site and timing of the last communication. The present system can use this timing and frequency information to determine the set of cell sites to page.

In subsequent page attempts MME 118 can expand the scope in each successive paging of the cell sites included (e.g., page the last 'n' eNBs, then the next 'm' eNBs—with m different from n). For example, if the first page attempt pages the 'n' last visited eNBs in the last TA, subsequent page attempts can page all eNBs in the last TA. Still further page attempts can also send a page to all eNBs in all TAs belonging to the tracking area list (TAL) (e.g., flood paging). The page attempts can also exclude previously paged combinations of eNBs and TAs. For example, if MME 118 pages the 'n' last visited eNBs 218 first, then MME 118 can exclude the 'n' last visited cell sites 218 when paging all eNBs in the last TA. The present system can use the list of eNBs last heard in the TA to identify eNBs commonly and regularly used by a subscriber. In determining when to initiate a subsequent page attempt, the heuristic can use a timer or specified delay, a trigger, or some other external indication. The specified delay can be set to be longer than the time it takes to receive a page response back from a UE. The specified delay may be based on statistical information that is collected on the chassis regarding page response times to page requests. Upon receiving the page response, MME 118 can begin establishing a data path and refrain from subsequent paging.

Figure 3:
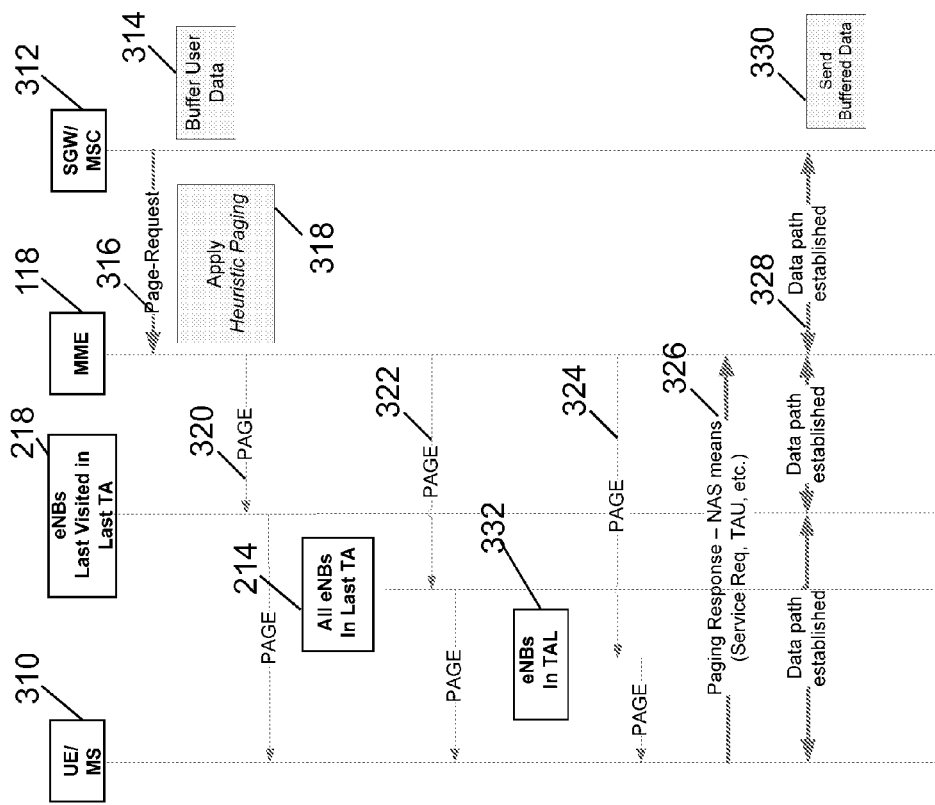
FIG. 3 illustrates a signaling flow with paging heuristics in accordance with certain embodiments.

The size of the recent activity list, which includes a number of cell sites last visited by the UE, can be based on a number of factors. These factors include the amount of memory available on the chassis running the MME functionality and the number of base stations such as eNBs in the tracking area. The size of the tracking area can be specified by the network operator and can be as large as 60,000 eNBs. The tracking area can also be on the size of 1,000-20,000, as this is dependent on conditions in the communications network. The relative size of the tracking area can influence the number of eNBs that are paged prior to paging the entire tracking area. The number of eNBs paged can be a number sufficient that there is a certain probability of reaching the UE in an attempt. For example, the number can be sufficient to guarantee an 80 percent chance of reaching the UE. The 'n' number of eNBs that were last visited can range from two to five eNBs in a smaller tracking area to twenty to fifty in a larger tracking area. For example, 'n' can be a percentage of the total size of the tracking area ranging from one to ten percent that are included on the recent activity list. The activity list can be implemented using a data structure in a computer readable medium or other storage medium that includes information used in determining the cell sites to page. The information can include UE information, location information, timing of last activity, and frequency of activity from a cell site. The activity list can also be implemented in a first in first out (FIFO) buffer where a cell site, such as an eNB, FIG. 3 illustrates a signaling flow with paging heuristics in accordance with certain embodiments. The network devices in FIG. 3 include an SGW/MSC 312, MME 118, 'n' last visited eNBs 218, all eNBs 214 in the last tracking area, and a user equipment/mobile subscriber 310. In 314, SGW/MSC 312 receives and buffers user data. SGW/MSC 312 can generate a page request to locate and establish communications with UE 310. In 316, SGW/MSC 312 sends a page request to MME 118. In 318, MME 118 can analyze the page request with a number of criteria such as determining the priority, deciding whether to allow the page (e.g., is it an authorized application?), and applying page heuristics (which can be based on the priority).

In one case, MME 118 sends a page 320 to the 'n' last visited eNBs 218 in the last TA. This can be a defined subset of base stations that are paged, and the number of base stations paged can be defined based on the page. For example, the present system can use criteria to analyze the page and determine how to handle the page. There is a probability that the mobile device being sought may still remain within range of the last base station (such as an eNB) that communicated with the mobile device. eNBs 218 send pages out on the radio frequency (RF) airwaves to reach UE 310. If UE 310 is within range of eNBs 218, UE 310 sends a paging response to MME 118. The paging response can include non-access stratum (NAS) information such as a service request and a tracking area update (TAU). If MME 118 does not receive a paging response, MME 118 sends a page 322 to all eNBs 214 in the last TA. Depending on the outcome of paging eNBs in 322, MME 118 can send a page 324 to all eNBs in all tracking areas in the Tracking Area List (TAL) 332 to find mobile device or UE 310. When UE 310 receives a page over the radio access interface between the base station and the UE, UE 310 sends a paging response 326, which can include a service request, a tracking area update, and other information. In 328, a data path can be established to UE 310 and the data buffered at SGW/MSC 312 can be sent in 330.

The LTE network tracks the location of UEs based on a tracking area identity (TAI). A list of tracking area identities can be assigned to the UE during an attach procedure and subsequently during tracking area update (TAU) and globally unique temporary user equipment identity (GUTI) relocation procedures. In the case of inter-radio access technology (2G/3G), the UE location tracking can be based on location area identity. For the registration in the network, MME 118 can give MSC 312 the 2G/3G location area ID (LAI) in which the mobile device is currently 'theoretically' located. This identifier can be determined based on the TAI, which is the corresponding identifier in a LTE network.

Figure 4:
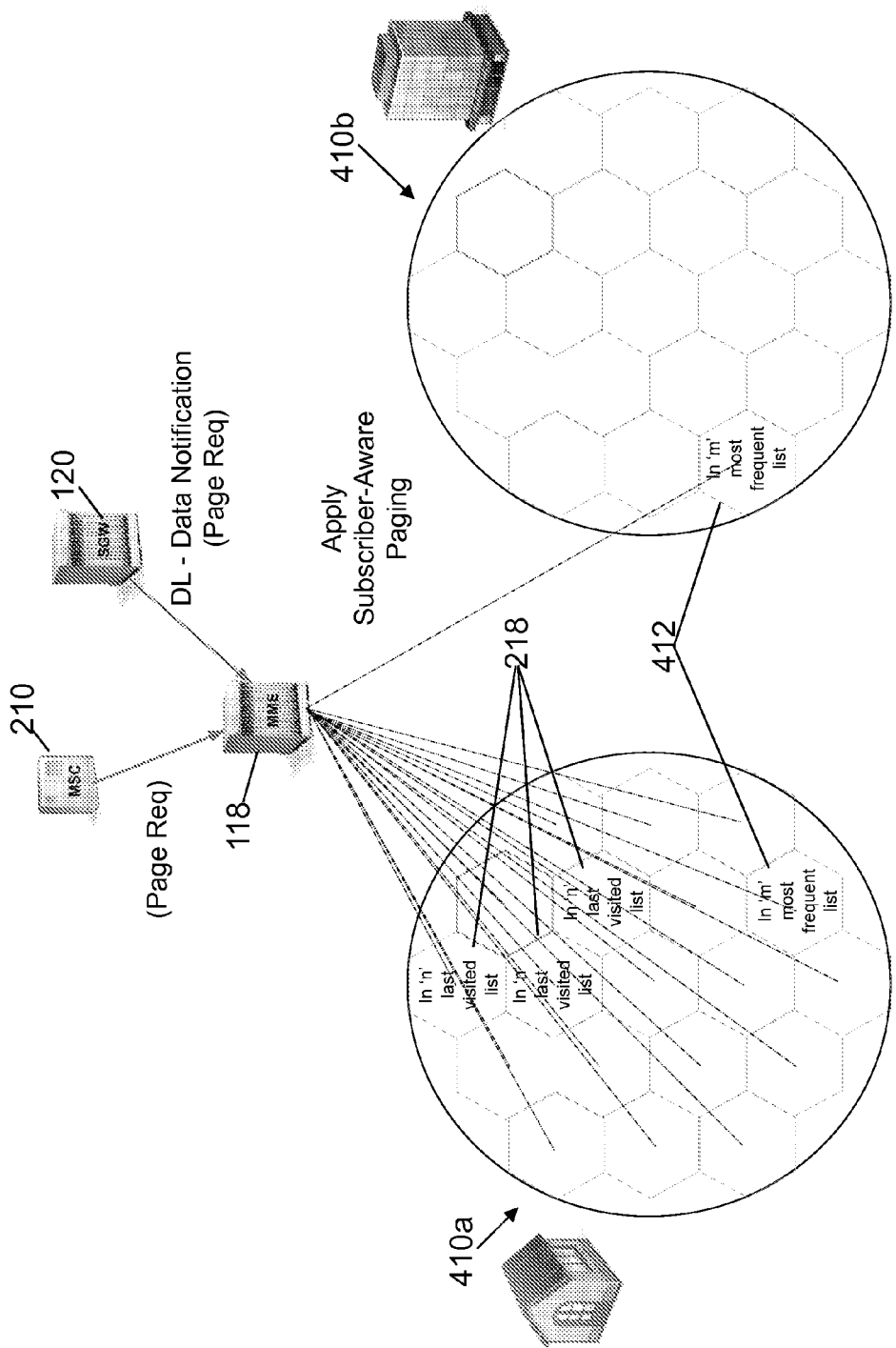
FIG. 4 illustrates sending of page messaging using subscriber awareness in accordance with certain embodiments.

FIG. 4 illustrates sending of page messaging using subscriber awareness in accordance with certain embodiments. FIG. 4 includes MME 118, SGW 120, MSC 210, and tracking areas 410a-b of eNodeB cell sites including eNodeB cells 216, 218, 412. The subscriber-aware paging can include keeping lists of a specified number of eNBs inside multiple tracking areas of interest from which the UE was last heard and which the UE frequently visits. For example, this list can include the five most frequently visited non-duplicative tracking area identities (TAI) from which there was communication with the UE. The list can also collect location information from the UE or base station, such as a cell ID or other eNB identifying information.

In FIG. 4, SGW 120 and MSC 210 can both send page requests to MME 118. MME 118 upon receiving a page request can apply subscriber awareness to send one or more pages within multiple tracking areas. For example, MME 118 can first send a page to eNB cell site 216 and to the last 'n' number of cell sites 218 from which the UE was heard, as described in connection with FIG. 2B. MME 118 can use the location information received at the MME regarding the UE's location (such as a TAI) to send a page request to these cell sites. MME 118 can use a list of cell sites from which the UE last actively communicated to page the UE. Subscriber-aware paging based on activity and location information can be tiered such that the most recently visited cell sites are paged first. Additionally, the activity list can include information regarding frequency of communication from a cell site and timing of the communication. The present system can use this timing and frequency information to determine the set of cell sites to page.

In subsequent page attempts MME 118 can expand the scope of successive paging of cell sites (e.g., page the last 'n' eNBs, then the next 'm' eNBs—with 'm' different from 'n'). The subsequent page attempts can also send a page to all eNBs belonging to the tracking area associated with the eNB from which the UE was last heard, or all eNBs in the tracking area list (TAL) of the MME (e.g., flood paging). The page attempts can also exclude previously paged combinations of eNBs and TAs. For example, if MME 118 pages the 'n' last visited cell sites 218 in the last TA first, then MME 118 can exclude the 'n' last-heard cell sites 218 when paging the next 'm' cell sites 412.

The present system can determine the eNBs in the list of next 'm' cell sites using subscriber awareness. The present system can determine a list of most frequent cell sites 412 per subscriber, which associates eNBs commonly and regularly used by a subscriber with the subscriber's activity such as a daily routine. For example, the subscriber may travel between home, corresponding to an eNodeB in tracking area 410a, and work, corresponding to an eNodeB in tracking area 410b. The present system determines a count of the most frequently visited eNodeBs per subscriber to determine which eNBs are most frequently visited.

In some embodiments, the system further uses subscriber awareness by correlating timestamps of when MME 118 heard from a UE via an eNodeB. Timestamps may include time of day, day of week, week, month, or year. For example, the present system may use awareness of the subscriber's activity patterns based on time of day to determine that an eNB in tracking area 410b should only be included in the list of next 'm' cell sites 412 during the hours of 8 am-6 pm corresponding to times during which the subscriber is at work. Further, the present system may determine activity windows by correlating timestamps with eNBs. For example, the present system can page only the most frequently heard-from eNBs for the subscriber within the past forty-eight hours. Other exemplary windows may include five days, two weeks, or twenty-four hours.

In other embodiments, the present system determines eNBs to include in the list of next 'm' cell sites by determining deviations from the most frequently visited cell sites. For example, if a subscriber is traveling from Boston, Mass. to San Jose, Calif., the eNBs heard from while the subscriber is in transit from the airport to a hotel or to a remote office will have a low count but a recent time stamp relative to the subscriber's most frequently visited eNBs. By determining based on the time stamp and low count that these eNBs represent deviations to include in the list of next 'm' cell sites, the present system is able to avoid an otherwise required paging flood to find the UE. In still further embodiments, the present system can use a different activity window for determining deviations to include in the list of next 'm' cell sites than for determining eNBs most frequently heard from. For example, the present system can use a three-hour window for determining eNBs representing deviations and a forty-eight hour window for determining most frequently visited eNBs for inclusion in the list of next 'm' cell sites.

In determining when to initiate subsequent page attempts, the subscriber-aware paging can use a timer or specified delay, a trigger, or some other external indication. The specified delay can be set to be longer than the time it takes to receive a page response back from a UE. The specified delay may be based on statistical information that is collected on the chassis regarding page response times to page requests. Upon receiving the page response, MME 118 can begin establishing a data path and refrain from subsequent paging.

Because each iteration of subsequent paging can introduce further wait time or delay before reaching the UE, the present system can determine whether to page the list of next 'm' cell sites at all, based on subscriber awareness of historical paging information. For example, the present system can determine a hit/miss ratio representing historical successes and failures of reaching the UE for a chosen eNB. If the hit/miss ratio is below a certain threshold, MME 118 may determine not to page the list of next 'm' cell sites. Instead, MME 118 may proceed to paging all eNBs in the tracking area containing the eNB from which the UE was last heard.

The size of the paging list, which includes a number of cell sites last visited and most frequently visited by the UE, can be based on a number of factors. These factors include the amount of memory available on the chassis running the MME functionality and the number of base stations such as eNBs in the tracking area. The size of the tracking area can be specified by the network operator and can be as large as 60,000 eNBs. The tracking area can also be on the size of 1,000-20,000, as this is dependent on conditions in the communications network. The relative size of the tracking areas can influence the number of eNBs that are paged prior to paging all eNBs in the tracking area containing the eNB from which the UE was last heard. The number of eNBs paged can be a number sufficient that there is a certain probability of reaching the UE in an attempt. For example, the number can be sufficient to guarantee an 80 percent chance of reaching the UE. The 'n' number of eNBs that were last heard from and 'm' number of eNBs most frequently visited can range from 2-5 eNBs in smaller tracking areas to 20-50 in a larger tracking area. For example, 'n' and 'm' can be a percentage of the total size of the tracking area ranging from one to ten percent that are included on the paging list.

Furthermore, the present system can determine based on historical information the statistics or probability of reaching the subscriber at a frequently visited eNB compared with an eNB deviating from the subscriber's typical activity. The present system can use the statistics to determine the number of eNBs representing deviations to include on the paging list compared with the number of most frequently visited eNBs to include. For example, the present system may determine that the UE frequently responds to page requests from most frequently visited eNBs in 80% of pages. Based on that information, in a list of 'm' next cell sites to page where m=5, the present system may decide to include four eNBs most frequently visited (80% of 5) and to include one eNB which represents a deviation from the most frequently visited eNBs.

The activity list can be implemented using a data structure in a computer readable medium or other storage medium that includes information used in determining the cell sites to page. The information can include UE information, location information, timing of activity, and frequency of activity from a cell site. The activity list can also be implemented in a first in first out (FIFO) buffer where cell sites are ordered or prioritized based on likelihood of reaching the UE.

Figure 5:
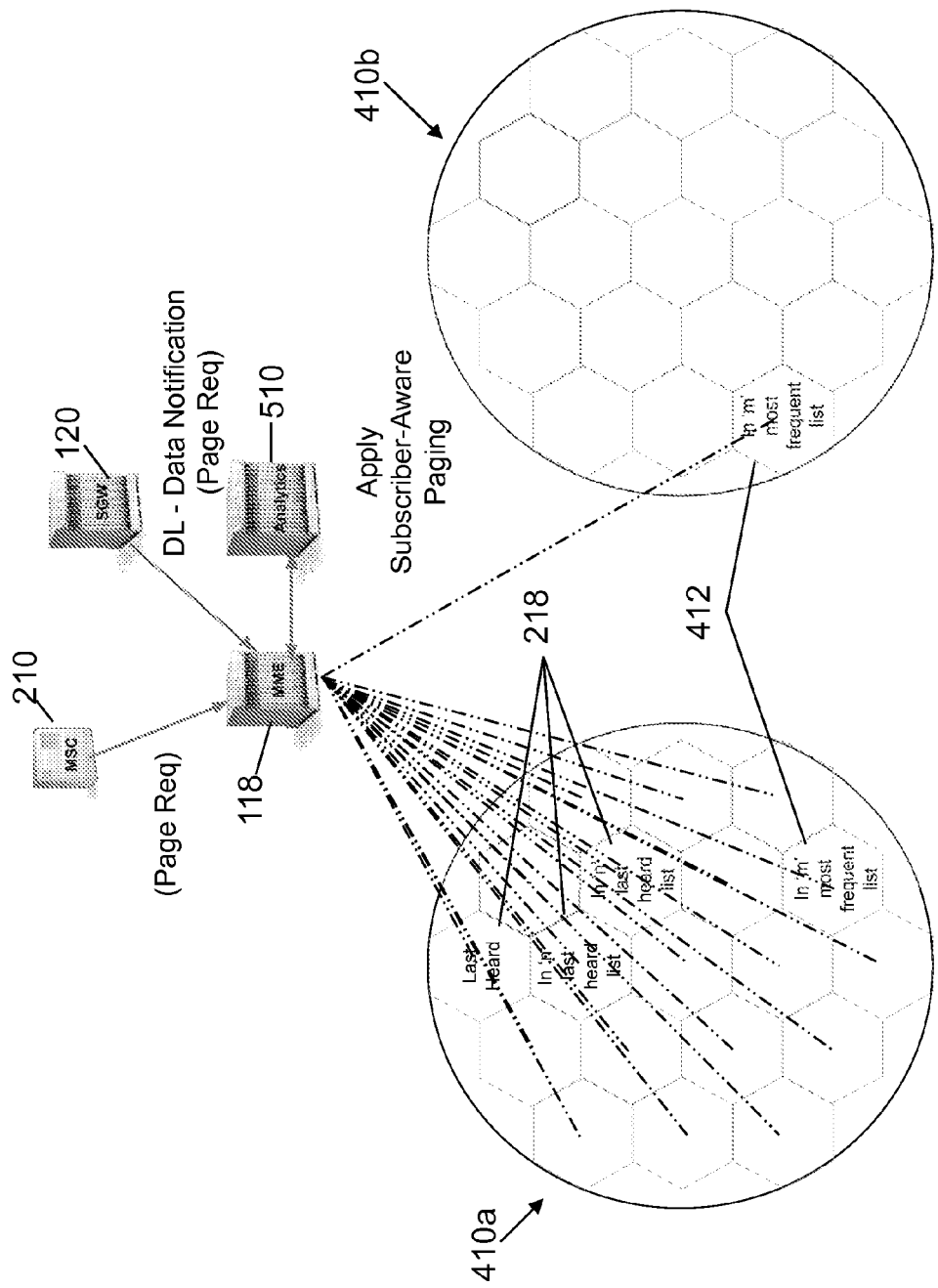
FIG. 5 illustrates sending of page messaging using subscriber awareness in communication with an analytics node in accordance with certain embodiments.

FIG. 5 illustrates sending of page messaging using subscriber awareness in communication with an analytics node in accordance with certain embodiments. FIG. 5 includes MME 118, an analytics node 510, SGW 120, MSC 210, and tracking areas 410*a-b* of eNodeB cell sites including eNodeB cells 218, 412. Upon receiving notice of certain subscriber events, MME 118 offloads determination of the list of 'm' next cell sites to page to analytics node 510 by sending subscriber location activity information to the analytics node. As used herein, analytics refers to the discovery and communication of meaningful patterns in data. Subscriber location activity information includes UE information, location information, timing of activity, frequency of activity from a cell site, and other information described in connection with FIG. 4. After determining the list of 'm' next cell sites by performing analytics on the subscriber location activity information, analytics node 510 sends the recommended list of 'm' next cell sites to MME 118. MME 118 uses the list of 'm' next cell sites to page the UE, as described in connection with FIG. 4.

In some embodiments, offloading performance of analytics to determine subscriber location activity allows analytics node 510 to discover patterns in the subscriber location activity information and generate reports thereon. Operators and service providers can use the discovered patterns to improve their network configuration. For example, service providers can aggregate eNB connection information from multiple subscribers to determine whether to adjust the size of a tracking area, or determine locations to add, move, or remove eNodeBs. A service provider might determine that a tracking area including eNodeBs near a busy airport might benefit from adjusting the size of the tracking area or from adding eNodeBs to increase capacity. In further embodiments, analytics node 510 can automatically suggest adjustments for operators and service providers to perform based on subscriber activity.

MME 118 updates or pages the list of 'm' next cell sites to page in response to certain subscriber events. These subscriber events can include subscriber attachment, detachment, tracking area updates (TAU), handover, and periodic intervals. As described above, the UE sends a message at the initial attachment and detachment procedures updating the MME on eNodeBs from which the UE is attaching or detaching. The UE also sends tracking area update (TAU) messages to the network whenever the UE moves out of its current tracking area. Handover refers to the process of transferring an in-progress call or data session from one channel connected to the core network to another. Handover is often triggered when a UE is moving away from an area covered by one cell and entering an area covered by another cell, when channel interference occurs, or to free capacity. During X2- or S1-handover between eNodeBs, MME 118 may update the list of 'm' next cell sites with the information received about the UE's location. MME 118 may also update the list of 'm' next cell sites at periodic intervals. When MME 118 receives any of these subscriber events, MME 118 updates the list of 'm' next cell sites to page for the UE.

Analytics node 510 can store the subscriber location activity information using a database in a computer readable medium or other storage medium. As described above, the subscriber location activity information includes UE information, location information, timing of subscriber location activity, frequency of activity from a cell site, and other information described in connection with FIG. 4.

Figure 6:
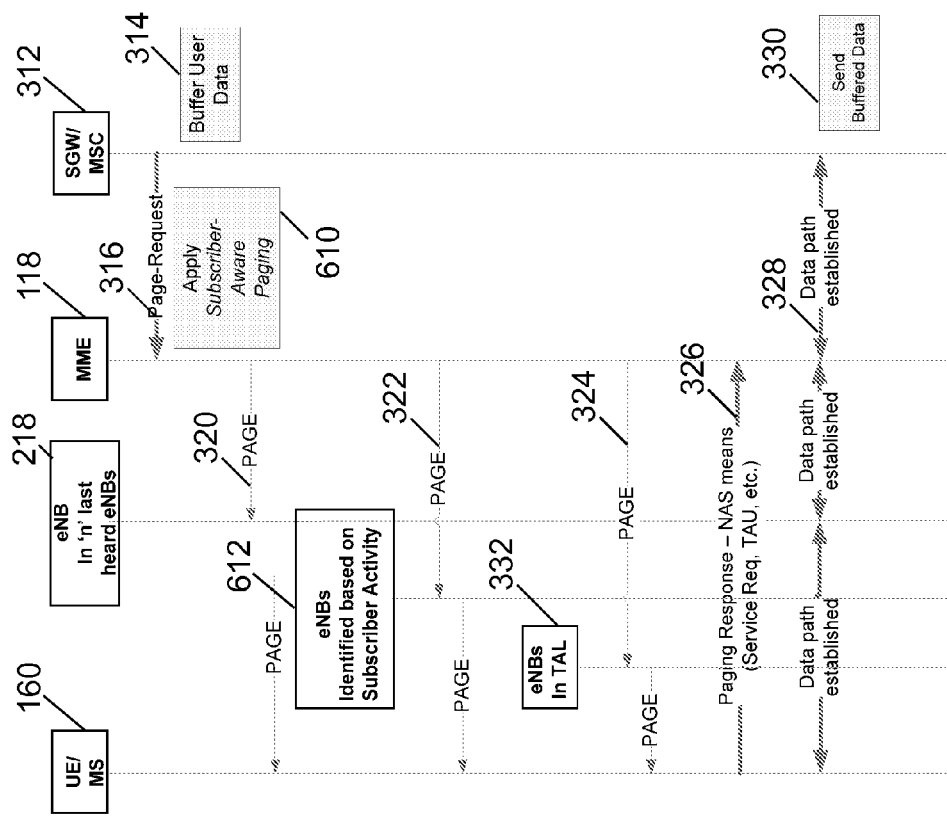
FIG. 6 illustrates a signaling flow with subscriber-aware paging in accordance with certain embodiments.

FIG. 6 illustrates a signaling flow with subscriber-aware paging in accordance with certain embodiments. The network devices in FIG. 6 include SGW/MSC 312, MME 118, eNBs in the list of 'n' last visited eNBs 218, eNBs in the list of 'm' next eNBs 612 identified based on subscriber activity, eNBs in tracking area list 332, and user equipment/mobile subscriber 310. In 314, SGW/MSC 312 receives and buffers user data. In 316, SGW/MSC 312 sends a page request to MME 118. In 610, MME 118 can analyze the page request and determine to apply subscriber-aware paging.

In one case, MME 118 sends a page 320 to the eNB last heard from. If MME 118 does not receive a paging response from UE 310, MME 118 can page the eNBs specified in the list of 'n' last heard eNBs 218. There is a probability that the mobile device being sought may still remain within range of the last base stations (such as eNBs) that communicated with the mobile device. Depending on the outcome of paging the last visited eNBs 218, MME 118 sends a page 322 to the eNBs in the list of 'm' next eNBs 612 identified based on subscriber location activity. As described earlier, the list of 'm' next eNBs can be identified based on analytics of subscriber-specific timing and frequency information. In some embodiments, MME 118 can offload determination of the list of 'm' next eNBs to an analytics node. For example, the analytics node or MME 118 can determine the eNBs most frequently visited by the mobile subscriber, deviations from eNBs most frequently visited, and determine a statistical frequency of how often a mobile subscriber is reachable at the most frequently visited eNBs instead of other eNBs.

Depending on the outcome of paging eNBs in 612, MME 118 can send a page 324 to the eNBs in tracking areas (TAs) in the tracking area list (TAL) 332 of MME 118 to find the mobile device or UE 310. When UE 310 receives a page over the radio access interface between the base station and the UE, UE 310 sends a paging response 326, which can include a service request, a tracking area update (TAU), and other information. In 328, a data path can be established to the UE 310 and the data buffered at SGW/MSC 312 can be sent in 330.

Figure 7:
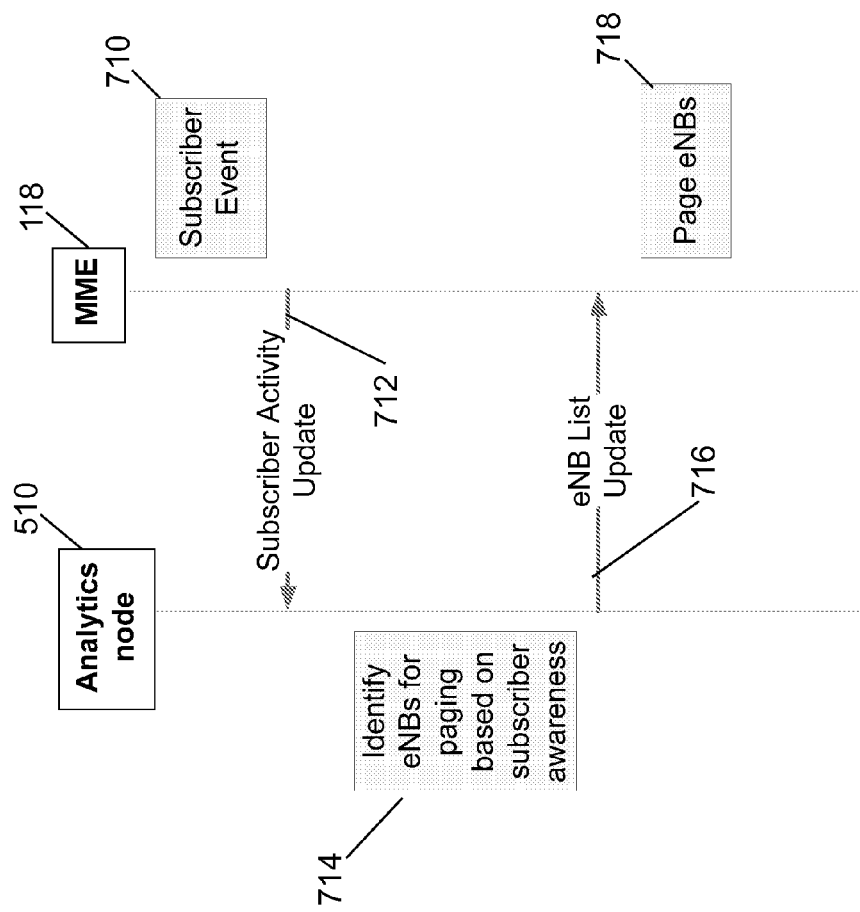
FIG. 7 illustrates a signaling flow between an MME and an analytics node in accordance with certain embodiments.

FIG. 7 illustrates a signaling flow between MME 164 and analytics node 510 in accordance with certain embodiments. As described above in connection with FIG. 5, in some embodiments MME 164 offloads analytics of subscriber location activity data to a subscriber-aware analytics node. In 710, MME 118 receives a subscriber event. Example subscriber events include subscriber attachment to the Evolved Packet System (EPS-ATTACH), DETACH, a tracking area update (TAU), X2- or S1-based handover. For example, if MME 118 receives a subscriber event of EPS-ATTACH, MME 118 sends a subscriber location activity update to analytics node 510 in 712. In some embodiments, the subscriber location activity update includes the following information: {IMSI, MSISDN (if available), [PLMN-ID, (eNB-ID, TAC, event type, timestamp)]}. IMSI refers to the International Mobile Subscriber Identity, and MSISDN refers to the Mobile Subscriber Integrated Services Digital Network-number of the mobile device. The update also includes the PLMN-ID (Public Land Mobile Network ID) associated with the operator or service provider. The update further includes the eNodeB ID (eNB ID) and Tracking Area Code (TAC) associated with the eNodeB to which the UE attached, and the timestamp of the MME. As described earlier, the event type is set to ATTACH. Sending this subscriber location activity update does not gate or block completion of the EPS-ATTACH procedure.

Analytics node 510 uses the information in the subscriber location activity update to infer eNodeBs for paging in 714. Analytics node 510 extracts relevant information in the subscriber location activity update and updates its database of subscriber information. Analytics node 510 uses the subscriber-specific information to infer a suggested list of eNBs for MME 118 to page in search of the UE. For example, analytics node 510 can determine a count of times the subscriber has visited a particular eNB-ID to infer eNBs which the subscriber will likely visit such as most frequent eNBs. Analytics node 510 can also determine eNB deviations from the most frequent eNBs based on eNB-IDs with low count but recent timestamps. Because analytics node 510 can be in communication with multiple MMEs and stores a database of multiple subscribers, analytics node 510 is also able to aggregate activity updates for multiple subscribers to determine "popular" eNodeBs at which there is a higher chance that a subscriber might be located. For example, a popular eNodeB or tracking area might be close to an airport.

Analytics node 510 sends to MME 118 an eNB list update in 716, representing a list of suggested eNBs for paging. In some embodiments, example information included in the eNB list update includes: {IMSI, MSISDN (if available), [suggested eNBs]}. As described earlier, the list of suggested eNBs can be based on the list of eNBs from which MME 118 last heard, or based on the most frequently visited eNBs by the mobile subscriber. In 718, MME 118 pages the suggested eNBs received from analytics node 510.

A chassis can be used implement multiple and different integrated functionalities and implement subscriber-aware paging. In some embodiments, a mobility management entity (MME), a serving gateway (SGW), a PDN gateway (P-GW), an access gateway, a packet data serving node (PDSN), a foreign agent (FA), or home agent (HA) can be implemented on a chassis. Other types of functionalities that can also be implemented on a chassis in other embodiments are a Gateway General packet radio service Serving Node (GGSN), a serving GPRS support node (SGSN), a packet data interworking function (PDIF), an access service network gateway (ASNGW), a base station, an access network, a User Plane Entity (UPE), an IP Gateway, an access gateway, a session initiation protocol (SIP) server, a proxy-call session control function (P-CSCF), and an interrogating-call session control function (I-CSCF), a serving gateway (SGW), and a packet data network gateway (PDN GW). In certain embodiments, one or more of the above-mentioned other types of functionalities are integrated together or provided by the same functionality. For example, an access network can be integrated with a PDSN. A chassis can include a PDSN, a FA, a HA, a GGSN, a PDIF, an ASNGW, a UPE, an IP Gateway, an access gateway, or any other applicable access interface device. In certain embodiments, a chassis is provided by Starent Networks, Corp. of Tewksbury, Mass. in a ST16 or a ST40 multimedia platform.

Figure 8:
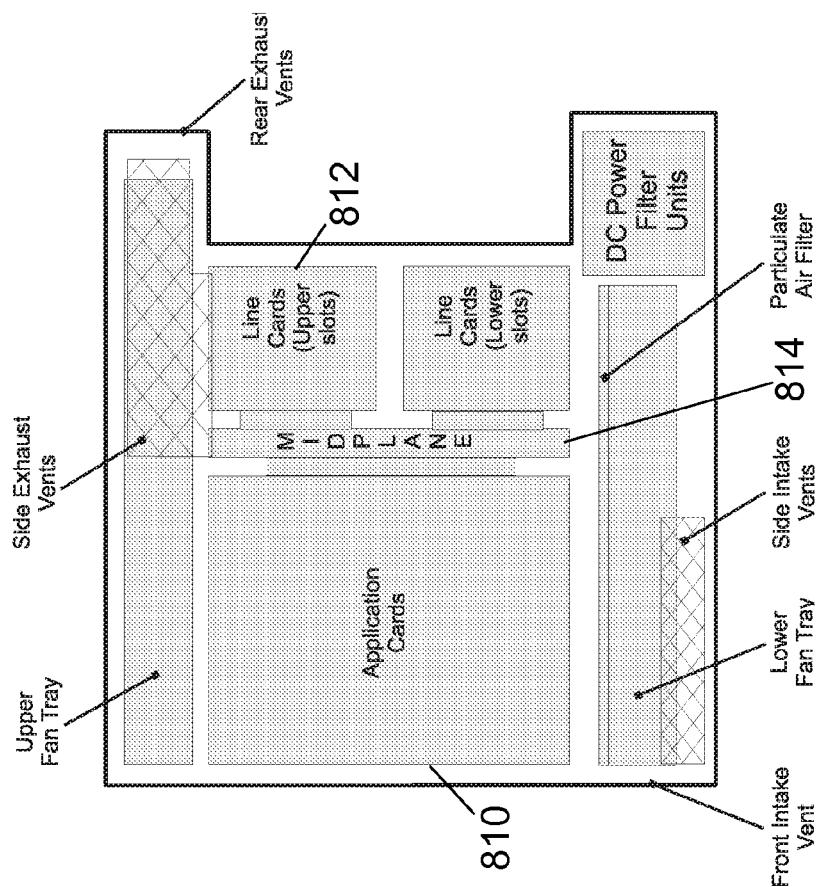
FIG. 8 illustrates a chassis in accordance with certain embodiments.

The features of a chassis that implements a gateway, in accordance with some embodiments, are further described below. FIG. 8 illustrates positioning of cards in the chassis in accordance with some embodiments. The chassis includes slots for loading application cards 810 and line cards 812. A midplane 814 can be used in the chassis to provide intra-chassis communications, power connections, and transport paths between the various installed cards. Midplane 814 can include buses such as a switch fabric, a control bus, a system management bus, a redundancy bus, and a time division multiplex (TDM) bus. The switch fabric is an IP-based transport path for user data throughout the chassis implemented by establishing inter-card communications between application cards and line cards. The control bus interconnects the control and management processors within the chassis. The chassis management bus provides management of system functions such as supplying power, monitoring temperatures, board status, data path errors, card resets, and other failover features. The redundancy bus provides transportation of user data and redundancy links in the event of hardware failures. The TDM bus provides support for voice services on the system.

The chassis supports at least four types of application cards: a switch processor card, a system management card, a packet service card, and a packet accelerator card. The switch processor card serves as a controller of the chassis and is responsible for such things as initializing the chassis and loading software configurations onto other cards in the chassis. The packet accelerator card provides packet processing and forwarding capabilities. Each packet accelerator card is capable of supporting multiple contexts. Hardware engines can be deployed with the card to support parallel distributed processing for compression, classification traffic scheduling, forwarding, packet filtering, and statistics compilations. The system management card is a system control and management card for managing and controlling other cards in the gateway device. The packet services card is a high-speed processing card that provides multi-threaded point-to-point, packet data processing, and context processing capabilities, among other things.

The packet accelerator card performs packet-processing operations through the use of control processors and a network processing unit. The network processing unit determines packet processing requirements; receives and transmits user data frames to and from various physical interfaces; makes IP forwarding decisions; implements packet filtering, flow insertion, deletion, and modification; performs traffic management and traffic engineering; modifies, adds, and strips packet headers; and manages line card ports and internal packet transportation. The control processors, also located on the packet accelerator card, provide packet-based user service processing. The line cards when loaded in the chassis provide input/output connectivity and can also provide redundancy connections as well.

The operating system software can be based on a Linux software kernel and run specific applications in the chassis such as monitoring tasks and providing protocol stacks. The software allows chassis resources to be allocated separately for control and data paths. For example, certain packet accelerator cards can be dedicated to performing routing or security control functions, while other packet accelerator cards are dedicated to processing user session traffic. As network requirements change, hardware resources can be dynamically deployed to meet the requirements in some embodiments. The system can be virtualized to support multiple logical instances of services, such as technology functions (e.g., a PDN GW, SGW, PDSN, ASNGW, PDIF, HA, GGSN, or IPSG).

The chassis' software can be divided into a series of tasks that perform specific functions. These tasks communicate with each other as needed to share control and data information throughout the chassis. A task is a software process that performs a specific function related to system control or session processing. Three types of tasks operate within the chassis in some embodiments: critical tasks, controller tasks, and manager tasks. Critical tasks control functions that relate to the chassis' ability to process calls such as chassis initialization, error detection, and recovery tasks. Controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. Manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a chassis include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the chassis by monitoring the various software and hardware components of the chassis. The recovery control task subsystem is responsible for executing a recovery action for failures that occur in the chassis and receives recovery actions from the high availability task subsystem. The shared configuration task subsystem provides the chassis with an ability to set, retrieve, and receive notification of chassis configuration parameter changes and is responsible for storing configuration data for the applications running within the chassis. The resource management subsystem is responsible for assigning resources (e.g., processor and memory capabilities) to tasks and for monitoring the task's use of the resources.

The virtual private network (VPN) subsystem manages the administrative and operational aspects of VPN-related entities in the chassis, which include creating separate VPN contexts, starting IP services within a VPN context, managing IP pools and subscriber IP addresses, and distributing the IP flow information within a VPN context. In some embodiments, within the chassis, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards. The session subsystem is responsible for processing and monitoring a mobile subscriber's data flows in some embodiments. Session processing tasks for mobile data communications include: A10/A11 termination for CDMA networks, GSM tunneling protocol termination for GPRS and/or UMTS networks, asynchronous PPP processing, packet filtering, packet scheduling, Difsery codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In some embodiments, the software needed for implementing a process or a database includes a high level procedural or an object-orientated language such as C, C++, C#, Java, or Perl. The software may also be implemented in assembly language if desired. Packet processing implemented in a chassis can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow. Other embodiments are within the following claims. For example, a chassis can implement a MME that provides subscriber-aware paging and a serving gateway function.

We claim:

1. A method comprising:
    maintaining, at a mobility management entity (MME) in a communication network, a list of eNodeBs from which a user equipment (UE) was actively communicating with the communication network, the list also including indications of tracking areas of eNodeBs of the list, wherein each tracking area includes a plurality of eNodeBs of the communication network;
    receiving a page request for the UE at the MME;
    in response to determining the tracking area of an eNodeB with which the UE was last actively communicating, sending a first page request to at least one eNodeB in the tracking area of the eNodeB with which the UE was last actively communicating;
    identifying a set of at least one tracking area to flood based on the list maintained at the MME, wherein at least one tracking area identified in the list maintained by the MME is excluded from the set of at least one tracking area to flood based on a frequency with which one or more eNodeBs of the at least one tracking area was used by the UE to actively communicate with the communication network; and
    sending an additional page request to at least one eNodeB of each tracking area of the identified set of at least one tracking area to flood.

2. The method of claim 1, wherein the additional page request is sent to each eNodeB of each tracking area of the identified set of at least one tracking area to flood.

3. The method of claim 1, wherein the additional page request is not sent to the eNodeBs in the tracking area of the eNodeB with which the UE was last actively communicating.

4. The method of claim 1, wherein the exclusion of the at least one tracking area identified in the list maintained by the MME from the set of at least one tracking area to flood is further based on one or more timestamps associated with one or more eNodeBs of the at least one excluded tracking area.

5. The method of claim 4, wherein the exclusion of the at least one tracking area identified in the list maintained by the MME from the set of at least one tracking area to flood is further based on the time of day when the set of at least one tracking area to flood is identified.

6. The method of claim 1, further comprising sending, prior to the sending of the additional page request, a second page request to at least all remaining eNodeBs of the tracking area of the eNodeB with which the UE was last actively communicating that have not yet received a page request from the MME in response to the page request received at the MME.

7. The method of claim 1, further comprising sending, prior to the sending of the additional page request, a second page request to eNodeBs not included in the first page request, wherein the eNodeBs that the second page request are sent to are determined based on a frequency with which the UE used the eNodeBs to actively communicate with the communication network.

8. An apparatus comprising:
    a storage medium configured to store a list of eNodeBs from which a user equipment (UE) was actively communicating with a communication network, the list also including indications of tracking areas of eNodeBs of the list, wherein each tracking area includes a plurality of eNodeBs of the communication network;
    a physical interface configured to:
        receive a page request for the UE;
        send a first page request to at least one eNodeB in the tracking area of an eNodeB with which the UE was last actively communicating, wherein the first page request is sent in response to a determination of the tracking area of the eNodeB with which the UE was last actively communicating;
    a processing unit configured to identify a set of at least one tracking area to flood based on the list, wherein at least one tracking area identified in the list is excluded from the set of at least one tracking area to flood based on a frequency with which one or more eNodeBs of the at least one tracking area was used by the UE to actively communicate with the communication network; and
    wherein the physical interface is further configured to send an additional page request to at least one eNodeB of each tracking area of the identified set of at least one tracking area to flood.

9. The apparatus of claim 8, wherein the additional page request is sent to each eNodeB of each tracking area of the identified set of at least one tracking area to flood.

10. The apparatus of claim 8, wherein the additional page request is not sent to the eNodeBs in the tracking area of the eNodeB with which the UE was last actively communicating.

11. The apparatus of claim 8, wherein the exclusion of the at least one tracking area identified in the list from the set of at least one tracking area to flood is further based on one or more timestamps associated with one or more eNodeBs of the at least one excluded tracking area.

12. The apparatus of claim 11, wherein the exclusion of the at least one tracking area identified in the list from the set of at least one tracking area to flood is further based on the time of day when the set of at least one tracking area to flood is identified.

13. The apparatus of claim 8, wherein the physical interface is further configured to send, prior to the sending of the additional page request, a second page request to at least all remaining eNodeBs of the tracking area of the eNodeB with which the UE was last actively communicating that have not yet received a page request from the MME in response to the page request received by the physical interface.

14. The apparatus of claim 8, wherein the physical interface is further configured to send, prior to the sending of the additional page request, a second page request to eNodeBs not included in the first page request, wherein the eNodeBs that the second page request are sent to are determined based on a frequency with which the UE used the eNodeBs to actively communicate with the communication network.

15. A computer-readable non-transitory medium comprising one or more instructions that when executed by a processor configure the processor to cause the performance of operations comprising:
   maintaining a list of eNodeBs from which a user equipment (UE) was actively communicating with a communication network, the list also including indications of tracking areas of eNodeBs of the list, wherein each tracking area includes a plurality of eNodeBs of the communication network;
   receiving a page request for the UE;
   in response to determining the tracking area of an eNodeB with which the UE was last actively communicating, sending a first page request to at least one eNodeB in the tracking area of the eNodeB with which the UE was last actively communicating;
   identifying a set of at least one tracking area to flood based on the list, wherein at least one tracking area identified in the list is excluded from the set of at least one tracking area to flood based on a frequency with which one or more eNodeBs of the at least one tracking area was used by the UE to actively communicate with the communication network; and
   sending an additional page request to at least one eNodeB of each tracking area of the identified set of at least one tracking area to flood.

16. The medium of claim 15, wherein the additional page request is sent to each eNodeB of each tracking area of the identified set of at least one tracking area to flood.

17. The medium of claim 15, wherein the exclusion of the at least one tracking area identified in the list from the set of at least one tracking area to flood is further based on one or more timestamps associated with one or more eNodeBs of the at least one excluded tracking area.

18. The medium of claim 17, wherein the exclusion of the at least one tracking area identified in the list from the set of at least one tracking area to flood is further based on the time of day when the set of at least one tracking area to flood is identified.

19. The medium of claim 15, wherein the instructions when executed by a processor further configure the processor to cause sending, prior to the sending of the additional page request, a second page request to at least all remaining eNodeBs of the tracking area of the eNodeB with which the UE was last actively communicating that have not yet received a page request from the response to the page request received for the UE.

20. The medium of claim 15, wherein the instructions when executed by a processor further configure the processor to cause sending, prior to the sending of the additional page request, a second page request to eNodeBs not included in the first page request, wherein the eNodeBs that the second page request are sent to are determined based on a frequency with which the UE used the eNodeBs to actively communicate with the communication network.

21. The method of claim 1, wherein the first page request is not sent to every eNodeB in the tracking area of the eNodeB with which the UE was last actively communicating, the method further comprising sending, prior to the sending of the additional page request, a second page request to at least one eNodeB selected from a group of one or more eNodeBs of the tracking area of the eNodeB with which the UE was last actively communicating, wherein the first page request was not sent to any eNodeBs of the group.

* * * * *